Patented May 24, 1938

2,118,769

UNITED STATES PATENT OFFICE 2,118,769

ALKANOL-AMMONIUM TARTRATES AND PROCESS OF MAKING THEM

Horace A. Shonle, Indianapolis, Ind., assignor to Eli Lilly and Company, Indianapolis, Ind., a corporation of Indiana No Drawing. Application August 4, 1937, Serial No. 157,309

6 Claims. (Cl. 260—11)

My invention relates to alkanol-ammonium antimonyl tartrates, and the process of making them.

In general, my new products may be said to be ammonium antimonyl tartrate in which from one to three of the hydrogen atoms of the ammonium radical are replaced by oxygen-containing-alkyl radicals, as for example the alkanol radicals. The substituted ammonium groups thus produced may be of considerable variety, such for example as those corresponding to the following oxygen-containing-alkyl amines.

a. Mono-, di-, and tri-ethanol amines.
b. The propanol (including i s o p r o p a n o l) amines.
c. The butanol (including iso- and secondary-butanol) amines.
d. Amino-trimethylene glycol.
e. Diamino-isopropyl alcohol.
f. Simple heterocyclic amines, such as condensation products from some of the above, as for example the morpholines.

These products are water-soluble products, of considerable stability; and are safely usable for intravenous administration, especially in treating protozoal and trypanosomal infections. They are well tolerated by the body, ordinarily with little or no untoward side-effects.

Among these substituted-ammonium antimonyl tartrates, the following are examples:

a. Ethanol - ammonium antimonyl tartrate, which may be represented by the following formula:

(1)    $(SbO)(C_4H_4O_6NH_3CH_2CH_2OH)$ b. Di-ethanol-ammonium antimonyl tartrate, which may be represented by the following formula:

(2)    $(SbO)[C_4H_4O_6NH_2(CH_2CH_2OH)_2]$ c. Isopropanol-ammonium antimonyl tartrate, which may be represented by the following formula:

(3)    $(SbO)(C_4H_4O_6NH_3CH_2CHOHCH_3)$

These may be prepared in several ways. Two methods of preparation are as follows:

Method I

Barium antimonyl tartrate is caused to react in aqueous solution, desirably hot, with an equivalent quantity of the sulfate of the oxygen-containing-alkyl amine corresponding to the desired substituted-ammonium group. A precipitate of barium sulfate results, and that precipitate is suitably separated as by filtration. The filtrate contains the desired substituted-ammonium antimonyl tartrate. This can easily be isolated; as by evaporation to dryness, preferably under vacuum; or by evaporation, preferably under vacuum, to a small volume, and the addition of sufficient alcohol to cause precipitation.

Method II

A solution of the desired oxygen-containing-alkyl-ammonium bitartrate (prepared by adding the equivalent amount of the desired oxygen-containing-alkyl amine to a solution of tartaric acid) in water is refluxed with somewhat more than the equivalent amount of antimony trioxide (preferably freshly prepared) for a period of several hours. When the reaction is completed, as indicated by the discontinuing of the disappearance of the antimony trioxide in the reaction, the excess antimony trioxide is removed, as by filtration; and the filtrate is concentrated, preferably under vacuum, to dryness or to a small volume, in which latter case alcohol is then added to cause precipitation. The residue from the drying, or the precipitate formed by the addition of the alcohol, is the desired substituted-ammonium antimonyl tartrate.

The resulting product by either process is a white solid, which is usually somewhat hygroscopic. It is readily soluble in water, in which solution it is most convenient to administer it intravenously; and is insoluble in alcohol.

The product obtained by either process is usually fairly pure, and with no further purification may be given intravenously in water solution. If further purification is desired, however, it may be obtained by recrystallization from a suitable solvent, such as dilute ethyl alcohol.

I claim as my invention:
1. An alkanol-ammonium antimonyl tartrate.
2. Ethanol-ammonium antimonyl tartrate.
3. Di-ethanol-ammonium antimonyl tartrate.
4. Isopropanol-ammonium antimonyl tartrate.
5. The process of making an alkanol-ammonium antimonyl tartrate, which consists in refluxing a solution of the desired alkanol-ammonium bi-tartrate in the presence of an excess of antimony trioxide, and separating any unreacted antimony trioxide.
6. The process of making an alkanol-ammonium antimonyl tartrate, which consists in refluxing a solution of the desired alkanol-ammonium bi-tartrate in the presence of antimony trioxide.

HORACE A. SHONLE.